2,829,990

PROCESS FOR FRACTIONATING STARCH INTO COMPONENTS WITH BRANCHED AND LINEAR CHAINS

Willem C. Bus, The Hague, Johannes Muetgeert, Rotterdam, and Pieter Hiemstra, Veendam, Netherlands, assignors to Cooperatieve Verkoop- en Productieverenigging van Aardappelmeel en Derivaten "Avebe" G. A., Veendam, Netherlands, a corporation of the Netherlands No Drawing. Application June 7, 1954
Serial No. 435,051

Claims priority, application Netherlands June 10, 1953

6 Claims. (Cl. 127—71)

This is a continuation-in-part of our U. S. patent application Serial No. 325,698, filed on December 12, 1952, relating to a process for fractionating starch into components with linear chains (amylose) and branched chains (amylopectin) according to which the starch is dissolved in an aqueous solution of at least one salt of the class consisting of magnesium sulphate, ammonium sulphate and sodium sulphate or of a mixture of two or three of these salts at elevated temperature and this solution is slowly cooled down. The amylose precipitates on cooling and is separated from the mother liquor e. g. by means of a centrifuge; on further cooling the amylopectin precipitates, which can also easily be separated from the mother liquor.

It has now been found that the process described in the United States patent application No. 325,698 can also be applied to starch which has been hydrolyzed in a known way to a product, the amylose fraction of which has a molecular weight of at least 20,000 calculated from the intrinsic viscosity of a solution in 1 N KOH according to the formula of Potter and Hassid (J. Am. Chem. Soc., 73 (1951), page 593).

The molecular weight of amylose in native starch is >200,000; the molecular weight of the purified amylose fraction herefrom lies as a rule between 100,000 and 200,000; in the dissolving process of the starch some hydrolysis nearly always takes place, unless special precautions are taken. The fractionating process as described in the patent application No. 325,698 can be applied to starch which is hydrolyzed to a further degree.

If, however, the molecular weight of the amylose in the hydrolyzed starch is below approx. 20,000, a proper separation into a fraction with branched and linear molecules can not be effected with the process according to the invention.

On dissolving at temperatures above 120° C. a reducing agent which is stable in an aqueous medium at this temperature can advantageously be added in the way as described in the pending patent application No. 325,698. It was thought that by carrying out the process in an atmosphere of nitrogen, the darkening of the starch which occurs at these high temperatures would be avoided. Some improvement was obtained, but the result was not completely satisfactory. In addition, the working costs are considerably higher than when the process is carried out in the presence of air.

The addition of reducing agents which are themselves stable in an aqueous solution at the chosen dissolving temperature of the starch substantially reduces and in many cases prevents the darkening from taking place. Sodium sulfate and sodium thiosulfate are examples of suitable reducing agents. The effective amount of reducing agent required to prevent discoloration is usually considerably less than the theoretical quantity. Thus, a level of .006% soduim sulfate is sufficient to prevent darkening in a magnesium sulfate solution of starch having a quantity of oxygen which will theoretically bind .05% sodium sulfate. No more than 1% of a reducing agent is generally employed.

The prevention of color formation is especially important where the fractionation process is conducted in a cycle and the mother lye from which the starch fractions have been separated is employed in dissolving a new quantity of hydrolysed starch. The reducing agent is also effective where aqueous solutions of sodium sulfate and ammonium sulfate are used as the fractionating liquid. It should be noted, however, that ammonium sulfate causes much more darkening than magnesium sulfate. Although the discoloration which occurs with ammonium sulfate cannot be entirely prevented, it is substantially reduced by this method.

It is also possible to regulate the salt concentration of the solution in such a way that the amylose is precipitated at room temperature without an appreciable quantity of amylopectin being precipitated at this temperature, and subsequently to increase the salt concentration for liberating the amylopectin, as fully described for starch in the co-pending patent application No. 429,104. This procedure allows the precipitation of amylose to take place at about room temperature and therefore avoids the difficult processing step of centrifuging the solution at a constant temperature above or below room temperature.

Precipitation of amylose and amylopectin from the solution depends not only upon the salt concentration and temperature of the solution but also upon other factors such as the viscosity of the solution, the starch concentration, the gravitational field of the centrifuge and upon the period of time lapsing between the time the solution reaches the amylose precipitating temperature and the time of centrifuging.

Preferably the hydrolysed starch is dissolved in a relatively concentrated salt solution which is thereafter diluted before separation of the amylose. The precipitate of amylose formed in a more concentrated salt solution is more easily separated from the mother liquor than a precipitate formed in a less concentrated salt solution. For example, hydrolysed starch is dissolved at a temperature of 160° C. in a solution having a concentration of between 25 and 30% of $MgSO_4 \cdot 7H_2O$ by weight. The solution is cooled to 70° C. for an hour and a half and then diluted with water until the salt concentration is between 18 and 25%, preferably 20–23%. The solution is cooled to room temperature, at which point the amylose precipitates but the amylopectin precipitates very little or not at all. After separation of the amylose by centrifugation at room temperature, the concentration of $MgSO_4 \cdot 7H_2O$ is increased to at least 25% and preferably 26–28% in order to precipitate the amylopectin. The ranges of salt concentration have been expressed above in terms of $MgSO_4 \cdot 7H_2O$. The same ranges, on an anhydrous basis, apply for $Na_2SO_4$ and for $(NH_4)_2SO_4$.

In special cases a slight quantity of a not completely water-miscible alcohol or similar liquid can be added to as also described in patent application No. 325,698. Suitable liquids include organic compounds from the group consisting of amyl alcohol, capryl alcohol, butyl alcohol and di-isopropyl ketone as described in co-pending application Serial No. 293,214 (United States Patent 2,803,568).

In application No. 325,698, the magnesium sulfate, sodium sulfate, ammonium sulfate, or suitable mixtures thereof, are present in the aqueous fractionating solutions in a concentration of more than 5% and may be as much as about 30% by weight of the anhydrous salt.

It is preferred, according to this invention, to use 5–30% of the salt on the same basis. If the salt concentration is less than 5% by weight of anhydrous salt, the amylose and amylopectin are very difficult to separate by precipitation.

Several types of hydrolysed starch may be used in the process of this invention, including those obtained from corn, wheat, potatoes and the like. It may be preferred to defat the materials before dissolving it in the fractionating solution, but this is not necessary. Very good results were obtained where 3–8% starch was dissolved in an aqueous magnesium sulfate solution having a concentration of from about 20 to about 30 grams of $MgSO_4.7H_2O$ per 100 cc. of solution. It has been found possible to work with raw material solutions having up to 20% by weight of starch, thus providing a substantial reduction in processing costs. If starch concentrations of more than 8%, as for example 15% are employed, the salt concentration of the solution may be lower than with a starch concentration of 8% or less.

The temperature at which the starch is dissolved is preferably higher than 115° C. At temperatures of 120–125° C., good results are obtained. At higher temperatures, e. g., 150–160° C., the dissolving is accomplished in much less time which has the advantage that the hydrolysis of the starch is less than if the dissolving takes place at temperatures of about 120° C., resulting in a higher molecular weight and easier separation of the fractions in the subsequent fractionation process.

Example I 94.1 g. so-called soluble starch from potatoes, the molecular weight of the amylose present being 44,000, determined according to Potter and Hassid, with a moisture content of 15% are dissolved in or suspended with water to a volume of 800 cc., together with 184.0 g., $MgSO_4.7$ aq. and 3.2 g. $Na_2SO_3.7$ aq. Heating is subsequently effected in an autoclave for 10 minutes at 160° C., followed by cooling to 20° C., as a result of which the linear chains precipitate which after some time are separated from the mother liquor by centrifugation.

Then so much $MgSO_4.7$ aq. is added to the mother liquor that the latter contains 30 g. $MgSO_4.7$ aq. per 100 cc., as a result of which amylopectin precipitates, which is also separated from the mother liquor by centrifugation.

The weight of the first fraction was 15 g., the amylose content being 80%; the weight of the second fraction was 56.2 g., the amylopectin content being 95%.

Example II

If the process is carried out in the same way, but 9.6 cc. isopentanol are moreover, added to the solvent, the yield of the first fraction is 16.9 g. and the amylose content of this fraction 90%; the weight of the second fraction is 53.1 g., the amylopectin content being 99%.

We claim:

1. Process for fractionating soluble starch containing amylose having a molecular weight of between 20,000 and 100,000 comprising dissolving between 3% and 20% by weight of said starch by heating at a temperature exceeding about 115° C. under pressure in an aqueous solution containing more than 5% by weight of a salt from the group consisting of magnesium sulfate, ammonium sulfate and sodium sulfate, cooling the solution to a temperature at which the amylose fraction precipitates but which is sufficiently high that the amylopectin fraction remains in solution, precipitating the amylose, separating said amylose from the solution, cooling the solution to a lower temperature until amylopectin precipitates and separating said amylopectin from the solution.

2. Process according to claim 1, comprising adding a compound of the class consisting of alkali metal sulphite and alkali metal bisulphites to the aqueous solutions in an amount up to about 1.0%.

3. Process for fractionating soluble starch containing amylose having a molecular weight of between 20,000 and 100,000 comprising dissolving between 3% and 20% by weight of said starch by heating at a temperature exceeding about 115° C. under pressure in an aqueous solution containing more than 5% by weight of a salt from the group consisting of magnesium sulfate, ammonium sulfate and sodium sulfate, and a compound of the class consisting of amyl alcohol, capryl alcohol, butyl alcohol and diisopropyl ketone a quantity of from 0.01 to 5% by volume, cooling the solution to a temperature at which the amylose fraction precipitates but which is sufficiently high that the amylopectin fraction remains in solution, precipitating the amylose, separating said amylose from the solution, cooling the solution to a lower temperature until amylopectin precipitates and separating said amylopectin from the solution.

4. Process according to claim 3, characterized in that a quantity of 0.05%–1% of a compound of the class consisting of alkali metal sulphites and alkali metal bisulphites, is added to the aqueous solutions.

5. Process for fractionating soluble starch containing amylose having a molecular weight of between 20,000 and 100,000 comprising dissolving between 3% and 20% by weight of said starch by heating at a temperature exceeding about 115° C. under pressure in an aqueous solution containing more than 5% by weight of a salt from the group consisting of magnesium sulfate, ammonium sulfate and sodium sulfate, cooling the solution to a temperature at which the amylose fraction precipitates but which is sufficiently high that the amylopectin fraction remains in solution, precipitating the amylose, separating said amylose from the solution, precipitating amylopectin by increasing the concentration of said salt in the solution and separating the amylopectin from the solution.

6. Process for fractionating soluble starch containing amylose having a molecular weight of between 20,000 and 100,000 comprising dissolving between 3% and 20% by weight of said starch by heating at a temperature exceeding about 115° C. under pressure in a concentrated aqueous solution of at least one salt from the group consisting of magnesium sulfate, ammonium sulfate and sodium sulfate, diluting the solution to decrease the concentration of the salt therein and prevent precipitation of amylopectin at the amylose precipitating temperature, cooling the diluted solution to the amylose precipitating temperature to precipitate amylose, separating the precipitated amylose from the solution, increasing the concentration of said salt in the solution to render amylopectin insoluble therein, and separating the amylopectin from the solution, said concentrated aqueous solution containing an amount of salt above the level at which, at the amylose precipitating temperature, the amylose precipitates but the amylopectin remains in solution.

References Cited in the file of this patent

UNITED STATES PATENTS

| | | |
|---|---|---|
| 2,001,925 | Thurber | May 21, 1935 |
| 2,014,799 | Fuller | Sept. 17, 1935 |
| 2,052,320 | Sjostrom | Aug. 25, 1936 |
| 2,515,095 | Schoch | July 11, 1950 |
| 2,515,096 | Schoch | July 11, 1950 |

FOREIGN PATENTS

| | | |
|---|---|---|
| 5,844 | Great Britain | of 1896 |
| 590,750 | Great Britain | July 28, 1947 |

OTHER REFERENCES

Journal Textile Institue, January 1948, page A-60.

UNITED STATES PATENT OFFICE
CERTIFICATE OF CORRECTION

Patent No. 2,829,990                        April 8, 1958

Willem C. Bus et al.

It is hereby certified that error appears in the printed specification of the above numbered patent requiring correction and that the said Letters Patent should read as corrected below.

Column 1, line 69, for "sulfate" read -- sulfite --; column 2, line 1, for "soduim sulfate" read -- sodium sulfite --; line 4, for "sulfate" read -- sulfite --.

Signed and sealed this 20th day of January 1959.

(SEAL)

Attest:

KARL H. AXLINE
Attesting Officer

ROBERT C. WATSON
Commissioner of Patents